(12) United States Patent
Sasagawa

(10) Patent No.: US 11,964,653 B2
(45) Date of Patent: Apr. 23, 2024

(54) DRIVING ASSISTANCE SYSTEM

(71) Applicant: TOYOTA JIDOSHA KABUSHIKI KAISHA, Toyota (JP)

(72) Inventor: Wataru Sasagawa, Susono (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 350 days.

(21) Appl. No.: 17/484,276

(22) Filed: Sep. 24, 2021

(65) Prior Publication Data
US 2022/0169242 A1 Jun. 2, 2022

(30) Foreign Application Priority Data

Nov. 30, 2020 (JP) .................................. 2020-198764

(51) Int. Cl.
*B60W 30/09* (2012.01)
*B60W 10/18* (2012.01)
*B60W 10/20* (2006.01)
*B60W 30/095* (2012.01)

(52) U.S. Cl.
CPC ............ *B60W 30/09* (2013.01); *B60W 10/18* (2013.01); *B60W 10/20* (2013.01); *B60W 30/0956* (2013.01); *B60W 2554/20* (2020.02); *B60W 2554/4026* (2020.02); *B60W 2554/4029* (2020.02); *B60W 2554/4041* (2020.02); *B60W 2554/4044* (2020.02)

(58) Field of Classification Search
CPC ...... B60W 30/09; B60W 10/18; B60W 10/20; B60W 30/0956; B60W 2554/20; B60W 2554/4026; B60W 2554/4029; B60W 2554/4041; B60W 2554/4044; B60W 40/00; B60W 40/02
See application file for complete search history.

(56) References Cited

U.S. PATENT DOCUMENTS

| | | | | |
|---|---|---|---|---|
| 10,496,091 B1 * | 12/2019 | Ross | ................... | G06N 5/04 |
| 2014/0112538 A1 * | 4/2014 | Ogawa | ................... | G06V 40/25 |
| | | | | 382/103 |
| 2017/0032678 A1 * | 2/2017 | Sim | .................. | B60W 10/30 |
| 2017/0329332 A1 * | 11/2017 | Pilarski | ............. | B60W 50/0097 |

(Continued)

FOREIGN PATENT DOCUMENTS

| | | | | |
|---|---|---|---|---|
| JP | 2004110394 A | * | 4/2004 | |
| JP | 2013173416 A | * | 9/2013 | .......... B60W 10/184 |
| JP | 2018-012360 A | | 1/2018 | |

*Primary Examiner* — Donald J Wallace
(74) *Attorney, Agent, or Firm* — Dinsmore & Shohl LLP

(57) ABSTRACT

A driving assistance system includes a processor and a memory that stores surroundings information indicating the surroundings of a vehicle detected by sensors mounted on the vehicle. The processor is configured to acquire the position of a target in front of the vehicle and the position of the boundary of a roadway area in front of the vehicle based on the surroundings information. The processor is configured to determine whether the target is in the roadway area based on the position of the target and the position of the boundary. The processor is configured to calculate the distance between the target and the boundary when the target is in the roadway area. The processor is configured to determine whether the target is crossing the roadway area based on the relationship between the distance and a time.

9 Claims, 11 Drawing Sheets

(56) References Cited

U.S. PATENT DOCUMENTS

| | | |
|---|---|---|
| 2018/0022328 A1 | 1/2018 | Tochigi et al. |
| 2018/0050698 A1* | 2/2018 | Polisson .............. G05D 1/0061 |
| 2018/0253595 A1* | 9/2018 | Aoki ....................... G06V 40/23 |
| 2019/0176820 A1* | 6/2019 | Pindeus ................. G06V 20/58 |
| 2021/0312795 A1* | 10/2021 | Schonfeld .............. G08G 1/012 |
| 2023/0117848 A1* | 4/2023 | Ferenets ............... G01S 13/931 |
| | | 342/70 |

* cited by examiner

DRIVING ASSISTANCE SYSTEM

CROSS-REFERENCE TO RELATED APPLICATION

This application claims priority to Japanese Patent Application No. 2020-198764 filed on Nov. 30, 2020, incorporated herein by reference in its entirety.

BACKGROUND

1. Technical Field

The present disclosure relates to a technique for determining whether a target is crossing the roadway area in front of a vehicle.

2. Description of Related Art

Japanese Unexamined Patent Application Publication No. 2018-012360 (JP 2018-012360 A) discloses a traveling assistance device mounted on a vehicle. The traveling assistance device detects a target, such as a pedestrian, based on a camera or a radar. When the future position of the detected target is included in the assistance range, the travelling assistance device performs collision avoidance control to avoid collision between the vehicle and the target.

SUMMARY

Driving assistance control (collision avoidance control) for avoiding collision between a vehicle and a target is known. To avoid collision, particular attention must be paid to a target such as a pedestrian crossing the roadway area in front of the vehicle. For proper driving assistance control, it is necessary to properly determine whether a target is crossing the roadway area in front of the vehicle.

One possible way to determine whether a target is crossing the roadway area is to pay attention to the position of the target and its moving direction. However, the accuracy is low when it is determined whether a target is crossing the roadway area based only on the position of the target and its moving direction. For example, in the situation shown in FIG. 1, the vehicle is traveling in front of a curved road. In this case, though a pedestrian is crossing ahead of the vehicle, the pedestrian has not entered the roadway area and is not crossing the roadway area. In this situation, it is incorrect to determine, based on the position of the pedestrian and its movement direction, that the pedestrian is crossing the roadway area. Such an incorrect determination may lead to an unnecessary operation of the driving assistance control.

The present disclosure provides a technique that makes it possible to more accurately determine whether a target is crossing the roadway area in front of a vehicle.

One aspect of the present disclosure relates to a driving assistance system. The driving assistance system includes a processor and a memory that stores surroundings information indicating the surroundings of a vehicle detected by sensors mounted on the vehicle. The processor is configured to acquire the position of a target in front of the vehicle and the position of the boundary of the roadway area in front of the vehicle based on the surroundings information. The processor is configured to determine whether the target is in the roadway area based on the position of the target and the position of the boundary. The processor is configured to calculate a distance between the target and the boundary when the target is in the roadway area. The processor is configured to determine whether the target is crossing the roadway area based on a relationship between the distance and a time.

The driving assistance system calculates the distance between a target and the boundary of the roadway area when the target is in the roadway area. Then, based on the relationship between the distance and the time, the driving assistance system determines whether the target is crossing the roadway area. Therefore, the accuracy in determining whether the target is crossing the roadway area is improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described below with reference to the attached drawings.

1. Outline of Driving Assistance System

Figure 2:
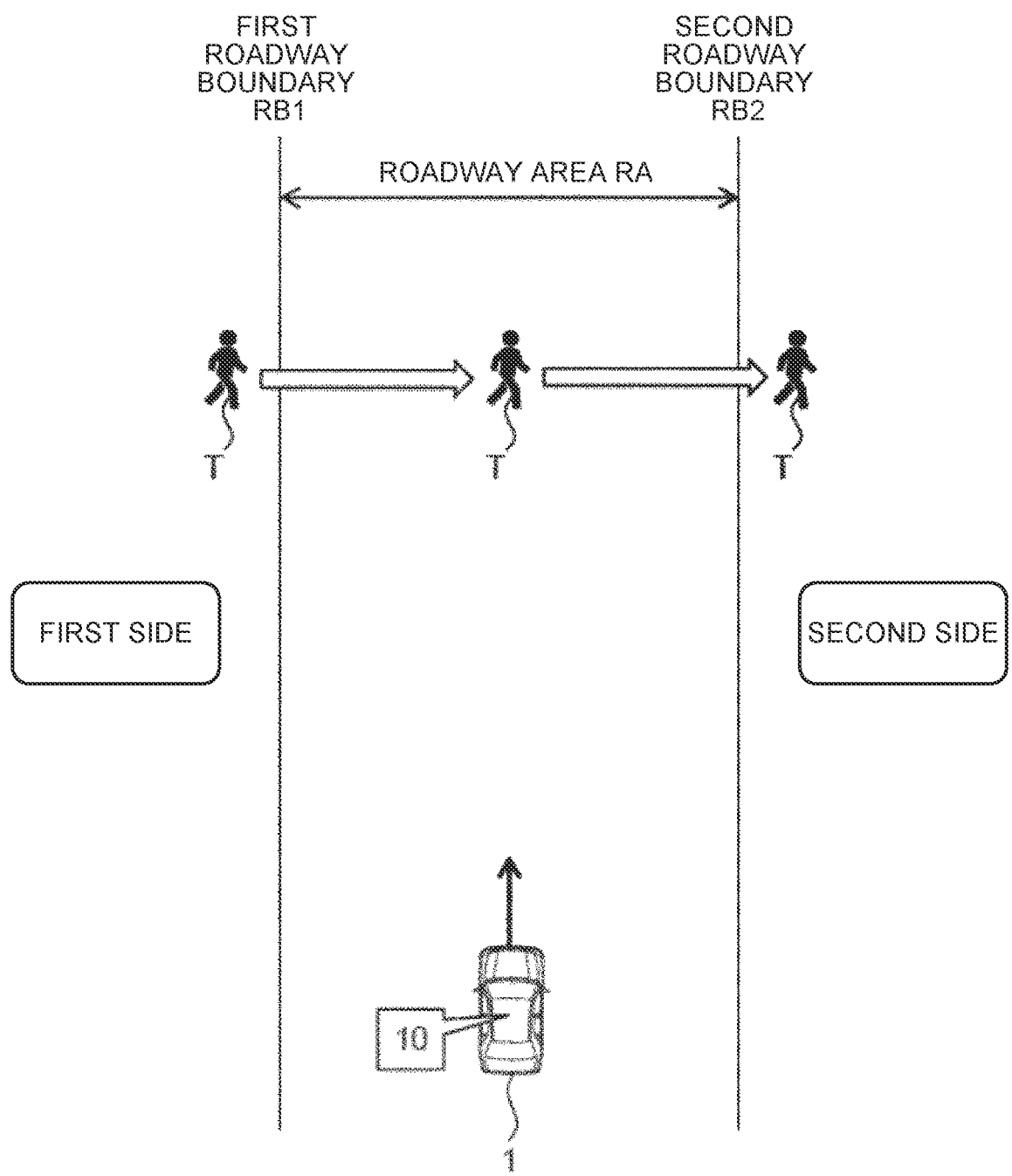
FIG. 2 is a conceptual diagram showing the outline of a driving assistance system according to an embodiment of the present disclosure.

FIG. 2 is a conceptual diagram showing the outline of a driving assistance system 10 according to this embodiment. The driving assistance system 10 performs the "driving assistance control" for assisting the driver in driving of a vehicle 1. The driving assistance control may be included in the autonomous driving control provided for controlling the autonomous driving of the vehicle 1. Typically, the driving assistance system 10 is mounted on the vehicle 1. Alternatively, at least a part of the driving assistance system 10 may be included in an external device outside the vehicle 1 to allow the driving assistance control to be performed remotely. That is, the driving assistance system 10 may be arranged in the vehicle 1 and an external device in a distributed fashion.

In this embodiment, the driving assistance control (collision avoidance control, risk avoidance control) is provided for avoiding collision with a target T in front of the vehicle 1. Examples of the target T to be avoided include a pedestrian, a bicycle, a motorcycle, another vehicle (preceding vehicle, parked vehicle, etc.), an animal, and a falling object. The driving assistance control for avoiding collision with the target T in front of the vehicle 1 includes at least one of deceleration control and steering control. That is, the driving assistance system 10 automatically performs at least one of the two operations, deceleration and steering, of the vehicle 1 to avoid collision with the target T in front of the vehicle 1.

In collision avoidance, particular attention is paid to the target T (for example, a pedestrian, a bicycle, an animal) that crosses the roadway area RA in front of the vehicle 1. The roadway area RA is an area in which various vehicles including the vehicle 1 travel. As shown in FIG. 2, the roadway area RA is an area between the first roadway boundary RB1 and the second roadway boundary RB2. The first roadway boundary RB1, one of the boundaries of the roadway area RA, is on the first side when viewed from the vehicle 1. The second roadway boundary RB2, the other boundary of the roadway area RA, is on the second side that is opposite to the first side when viewed from the vehicle 1. The roadway boundary is, for example, the roadway outer line (outermost marking line). As another example, the roadway boundary may be a roadside object such as a curb, a guardrail, a wall, or a median strip.

The target T that crosses the roadway area RA crosses the roadway area RA in front of the vehicle 1 from the first side to the second side. More specifically, the target T crosses the first roadway boundary RB1 and enters the roadway area RA. After that, the target T moves in the roadway area RA toward the second roadway boundary RB2. Then, the target T crosses the second roadway boundary RB2 and goes out of the roadway area RA.

For proper driving assistance control, it is required to properly determine whether the target T is crossing the roadway area RA in front of the vehicle 1. To meet this requirement, the driving assistance system 10 according to this embodiment performs the "crossing determination processing" for determining whether the target T is crossing the roadway area RA in front of the vehicle 1. In that sense, the driving assistance system 10 can also be called a "crossing determination system."

The crossing determination processing performed by the driving assistance system 10 according to this embodiment will be described below in more detail.

2. Crossing Determination Processing

Figure 3:
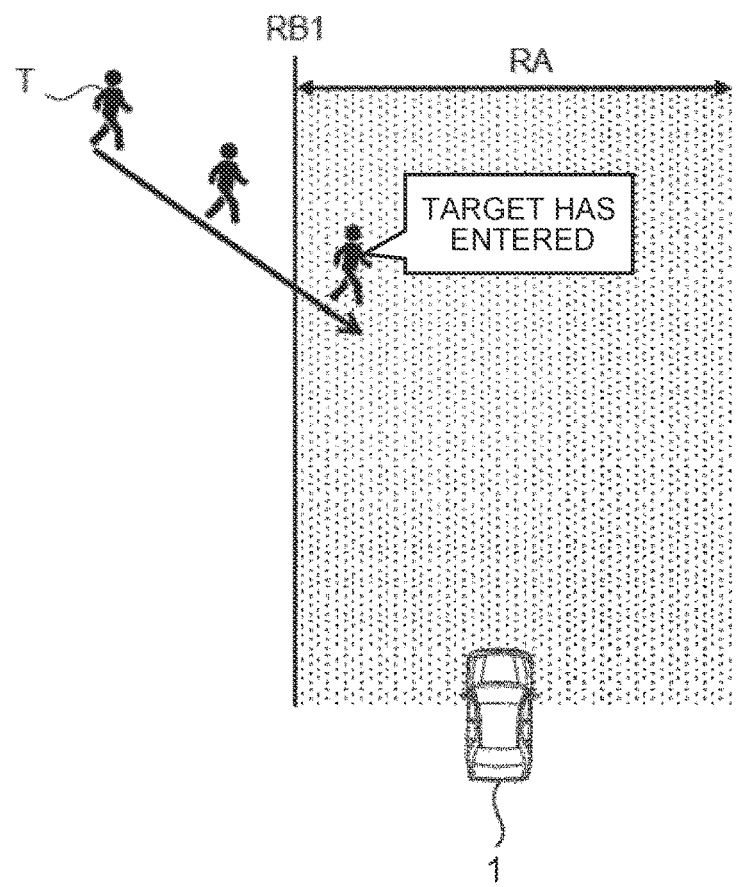
FIG. 3 is a conceptual diagram showing the crossing determination processing according to the embodiment of the present disclosure.

FIG. 3 is a conceptual diagram showing the crossing determination processing according to this embodiment. FIG. 3 shows a change in the position of the target T in the vehicle coordinate system, that is, a change in the relative position of the target T as seen from the vehicle 1. The relative position of the target T with respect to the vehicle 1 is defined by the distance from the vehicle 1 to the target T and the direction. By using sensors such as a camera, radar, and LIDAR mounted on the vehicle 1, the target T can be detected and the relative position (distance and direction) of the detected target T can be calculated.

In the crossing determination processing according to this embodiment, not only the position of the target T but also the positions of the boundaries of the roadway area RA are taken into consideration. In particular, the position of the first road boundary RB1 on the side where the target T starts crossing is taken into consideration. As in the case of the target T, the first roadway boundary RB1 can be detected by the sensors mounted on the vehicle 1 and, in addition, the relative position (distance and direction) of the detected first roadway boundary RB1 can be calculated. The driving assistance system 10 performs the crossing determination processing based on the positional relationship between the target T and the first roadway boundary RB1.

For example, in the situation shown in FIG. 3, the target T has crossed the first roadway boundary RB1 and has entered the roadway area RA. By comparing the position of the target T with the position of the first roadway boundary RB1, the driving assistance system 10 can recognize that the target T has crossed the first roadway boundary RB1 and has entered the roadway area RA. Then, the driving assistance system 10 determines that the target T that has crossed the first roadway boundary RB1 and has entered the roadway area RA is crossing the roadway area RA.

Figure 1:
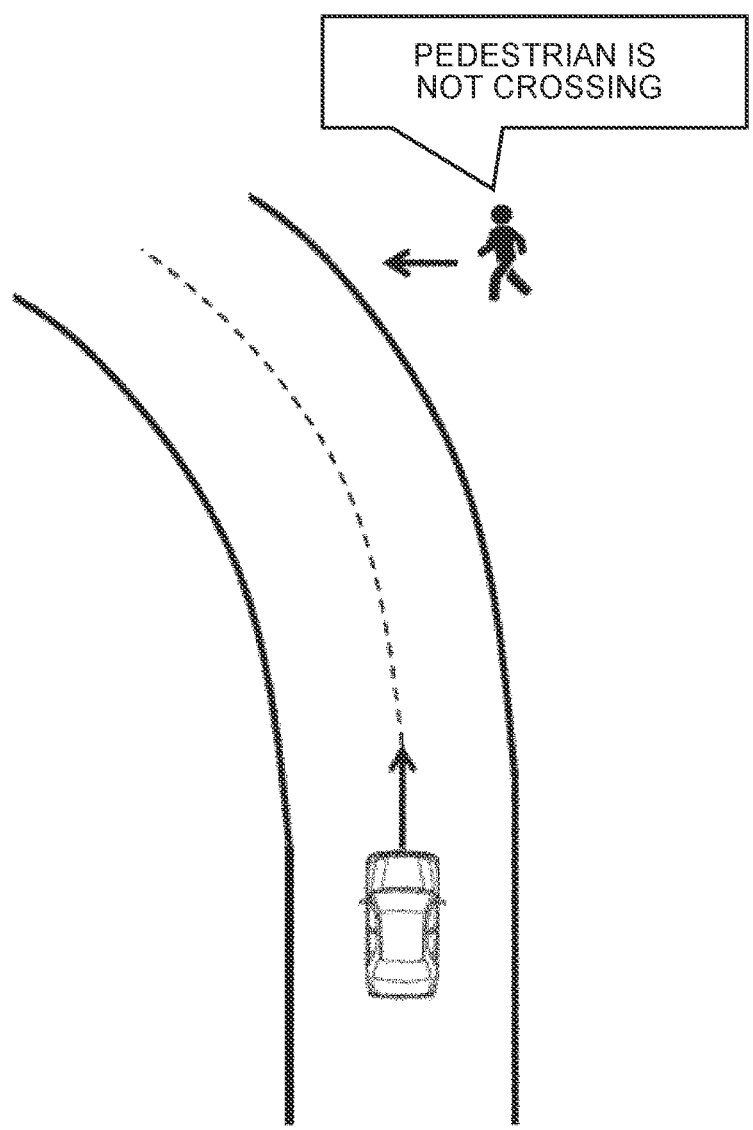
FIG. 1 is a conceptual diagram showing a problem.

Since the crossing determination processing is performed as described above based on the positional relationship between the target T and the first roadway boundary RB1, the driving assistance system 10 prevents an incorrect determination such as that shown in FIG. 1. That is, this embodiment improves the accuracy in the crossing determination. An improvement in the accuracy in the crossing determination, in turn, reduces an unnecessary operation of the driving assistance control. This leads to a reduction in the discomfort of the driver of the vehicle 1, improving the reliability of the driving assistance control.

Figure 4:
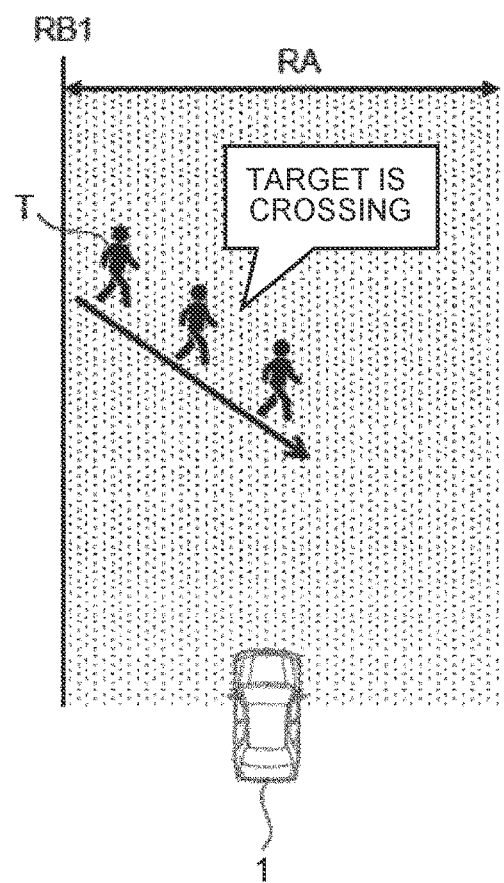
FIG. 4 is a conceptual diagram showing the crossing determination processing according to the embodiment of the present disclosure.
Figure 5:
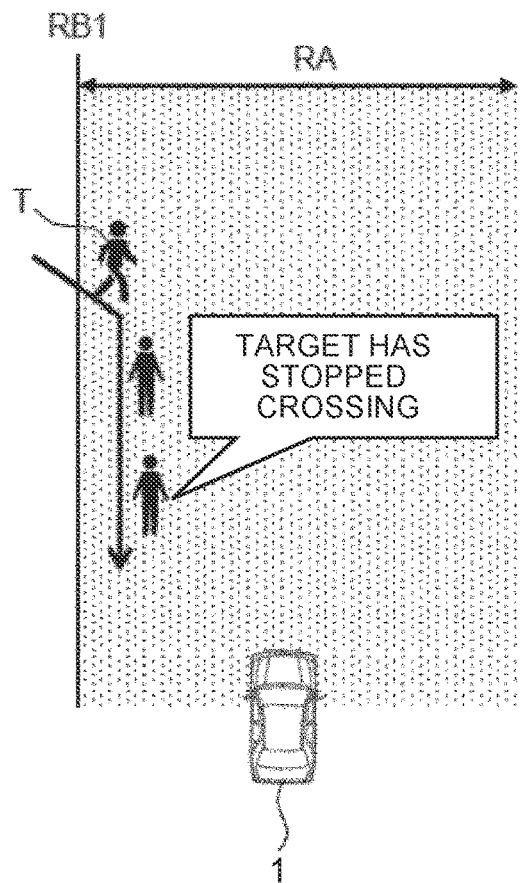
FIG. 5 is a conceptual diagram showing the crossing determination processing according to the embodiment of the present disclosure.

As another example, FIG. 4 shows a situation in which the target T is crossing the roadway area RA. On the other hand, FIG. 5 shows a situation in which the target T has stopped crossing the roadway area RA and is not approaching the vehicle 1. In this way, even when in the roadway area RA, the target T is not always approaching the vehicle 1. This means that, in the crossing determination processing in this embodiment, the behavior of the target T in the roadway area RA is also identified. That is, this embodiment determines not only whether the target T in the roadway area RA is crossing but also whether the target T continues, or has stopped, crossing. This further improves accuracy in the crossing determination.

First, whether the target T is in the roadway area RA can be determined by comparing the position of the target T with the position of the first road boundary RB1 of the roadway area RA. When the target T is nearer to the vehicle 1 than the first road boundary RB1, the target T is in the roadway area RA. Note that the target T mentioned above is not limited to the target T that has been recognized to enter the roadway area RA from outside as shown in FIG. 3. In some cases, the target T is detected in the roadway area RA for the first time by the sensor after the target T has entered the roadway area RA. In any case, the driving assistance system 10 can determine whether the target T is in the roadway area RA based on the position of the target T and the position of the roadway area RA.

When the target T is in the roadway area RA, the driving assistance system 10 calculates the distance d between the target T and the first road boundary RB1. As can be seen from FIG. 4 and FIG. 5, the relationship between the distance d and the time is completely different depending on whether the target T continues crossing or has stopped crossing. To keep track of this relationship, the driving assistance system 10 repeatedly calculates the distance d and keeps the history of the distance d. Then, based on the relationship between the distance d and the time, the driving assistance system 10 determines whether the target T continues, or has stopped, crossing the roadway area RA. That is, based on the relationship between the distance d and the time, the driving assistance system 10 performs the crossing determination processing to determine whether the target T is crossing the roadway area RA. This further improves the accuracy in the crossing determination.

Various examples of the crossing determination processing based on the relationship between the distance d and time will be described below.

2-1. First Example

Figure 6:
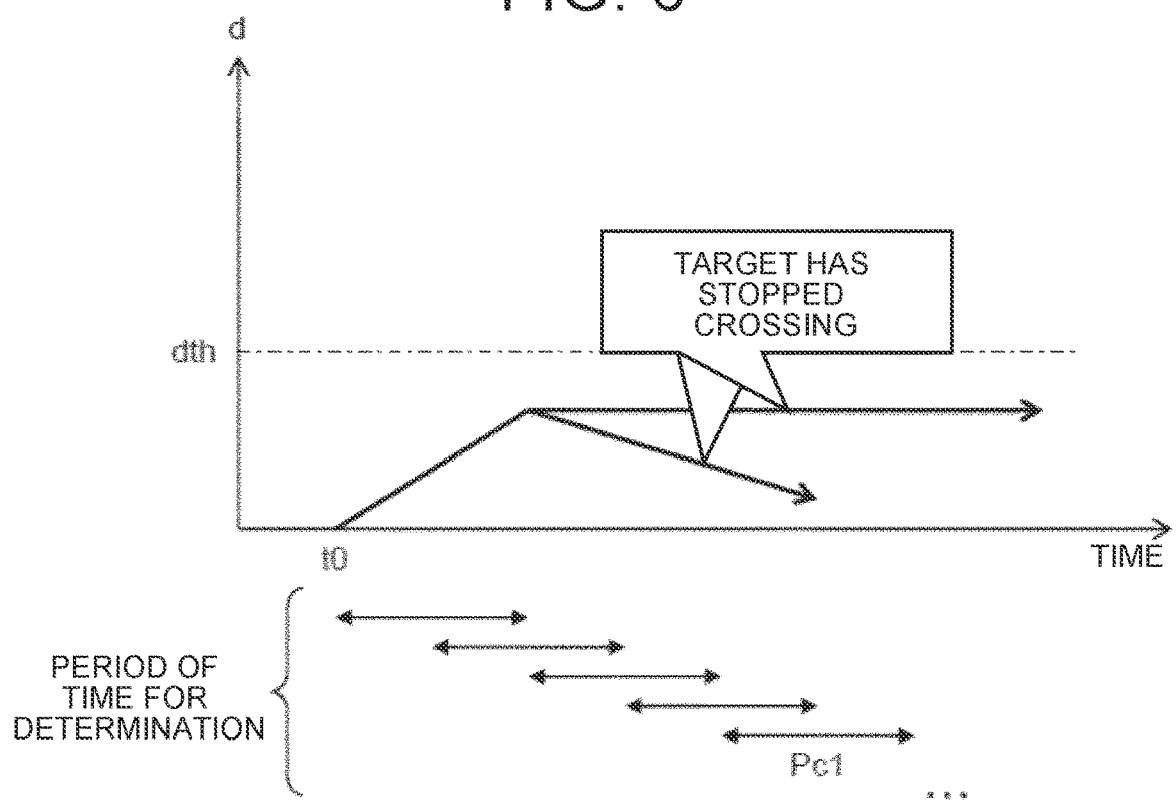
FIG. 6 is a graph chart showing a first example of the crossing determination processing according to the embodiment of the present disclosure.

FIG. 6 is a graph chart showing a first example of the crossing determination processing. The horizontal axis represents the time. The vertical axis represents the distance d between the target T in the roadway area RA and the first roadway boundary RB1. At time t0, the target T crosses the first roadway boundary RB1 and enters the roadway area RA. After that, the target T stops without moving much, or walks back toward the first road boundary RB1. In any case, the target T stops crossing the roadway area RA near the first roadway boundary RB1.

In the first example, the driving assistance system 10 determines whether the distance d exceeds a predetermined value dth. The predetermined value dth is the value of the width that defines an area near the first roadway boundary RB1. When the state in which the distance d does not exceed the predetermined value dth continues for a certain period of time Pc1 or longer, it is highly possible that, near the first boundary RB1, the target T has stopped crossing the roadway area RA. Therefore, when the state in which the distance d does not exceed the predetermined value dth continues for a certain period of time Pc1 or longer, the driving assistance system 10 determines that the target T is not crossing the roadway area RA.

The condition for determining that the target T in the roadway area RA is crossing the roadway area RA is referred to as the "crossing condition" in the description below. On the other hand, the condition for determining that the target T in the roadway area RA is not crossing the roadway area RA is referred to as the "stop condition" in the description below. The stop condition in the first example is that "the state in which the distance d does not exceed the predetermined value dth continues for a certain period of time Pc1 or longer." The crossing condition is that the stop condition is not satisfied.

2-2. Second Example

Figure 7:
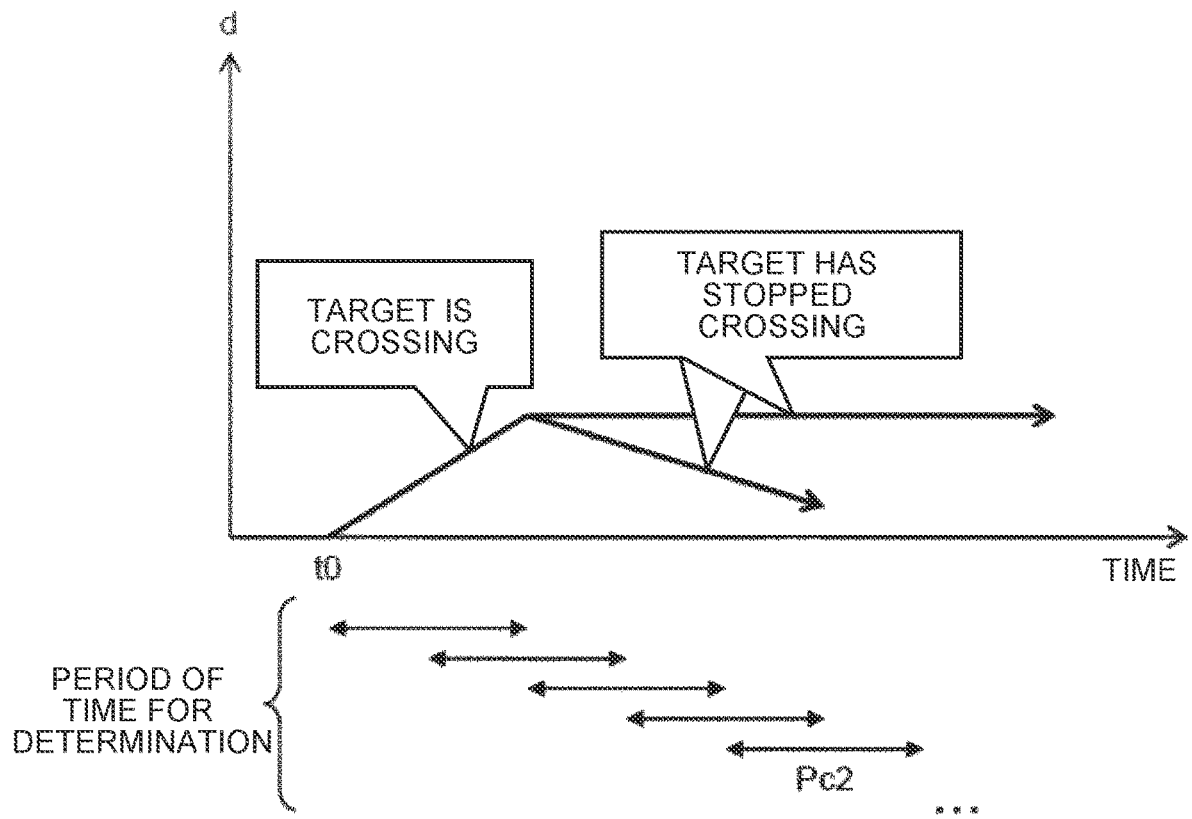
FIG. 7 is a graph chart showing a second example of the crossing determination processing according to the embodiment of the present disclosure.

FIG. 7 is a graph chart showing a second example of the crossing determination processing. The behavior of the target T in the roadway area RA is the same as in FIG. 6.

In the second example, the driving assistance system 10 determines whether the distance d increases. When the distance d does not change or decreases, it is determined that the distance d has not increased. When the state in which the distance d does not increase continues for a certain period of time Pc2 or longer, the driving assistance system 10 determines that the target T is not crossing the roadway area RA. That is, the stop condition in the second example is that "the state in which the distance d does not increase continues for a certain period of time Pc2 or longer." The crossing condition is that the stop condition is not satisfied.

2-3. Third Example

A third example is a combination of the first example and the second example. That is, the stop condition in the third example is that "the state in which the distance d does not exceed the predetermined value dth and does not increase continues for a certain period of time or longer."

2-4. Fourth Example

Figure 8:
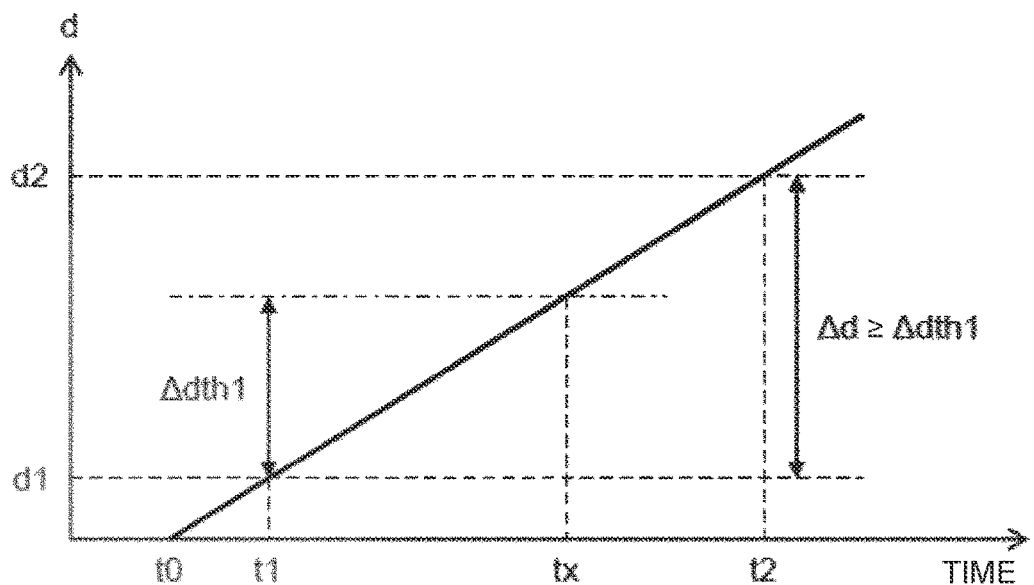
FIG. 8 is a graph chart showing a fourth example of the crossing determination processing according to the embodiment of the present disclosure.

FIG. 8 is a conceptual diagram showing a fourth example of the crossing determination processing. When the distance d increases significantly over a period of time, it is considered that the target T is crossing the roadway area RA. Therefore, in the fourth example, the driving assistance system 10 determines whether the target T is crossing the roadway area RA with consideration for the amount of increase in the distance d in the period between first time t1 and second time t2 during which the target T is in the roadway area RA.

First time t1 is the reference time for calculating the amount of increase in the distance d. For example, first time t1 is the time immediately after the target T has entered the roadway area RA. Alternatively, first time t1 may be the time at which the target T is detected for the first time by the sensor after the target T has entered the roadway area RA. In that case, first time t1 may be the time immediately after the target T is detected for the first time. First time t1 may also be the time at which the distance d with respect to the target T in the roadway area RA is calculated for the first time. Second time t2 is a time later than first time t1. For example, second time t2 is the time at which the latest distance d is calculated.

A first distance d1 is the distance d at first time t1. A second distance d2 is the distance d at second time t2. The distance difference $\Delta d$, the difference between the second distance d2 and the first distance d1, is represented by $\Delta d = d2 - d1$. In the fourth example, the driving assistance system 10 determines that the target T is crossing the roadway area RA when the second distance d2 is larger than the first distance d1 and when the distance difference $\Delta d$ is equal to or larger than the threshold value $\Delta dth1$.

In the example shown in FIG. 8, the target T is crossing the roadway area RA with the distance d increasing constantly. In this example, the distance difference $\Delta d$ reaches the threshold value $\Delta dth1$ at time tx. Therefore, when second time t2 becomes later than time tx, the driving assistance system 10 determines that the target T is crossing the roadway area RA.

Figure 9:
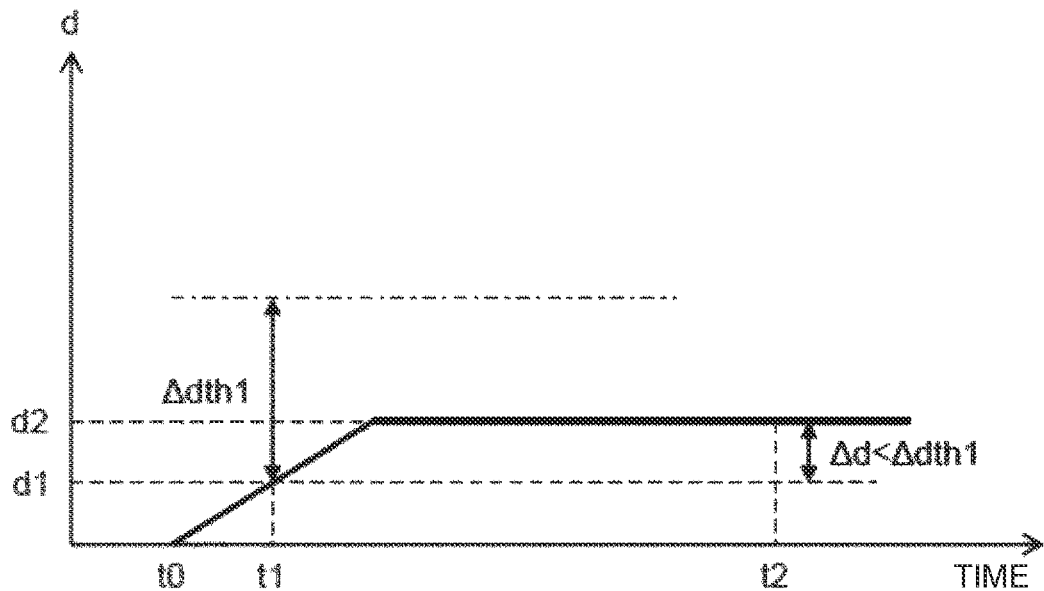
FIG. 9 is a graph chart showing the fourth example of the crossing determination processing according to the embodiment of the present disclosure.

In the example shown in FIG. 9, the target T has stopped crossing the roadway area RA. In this example, the distance difference Δd remains smaller than the threshold value Δdth1. Therefore, the driving assistance system 10 determines that the target T is not crossing the roadway area RA.

Figure 10:
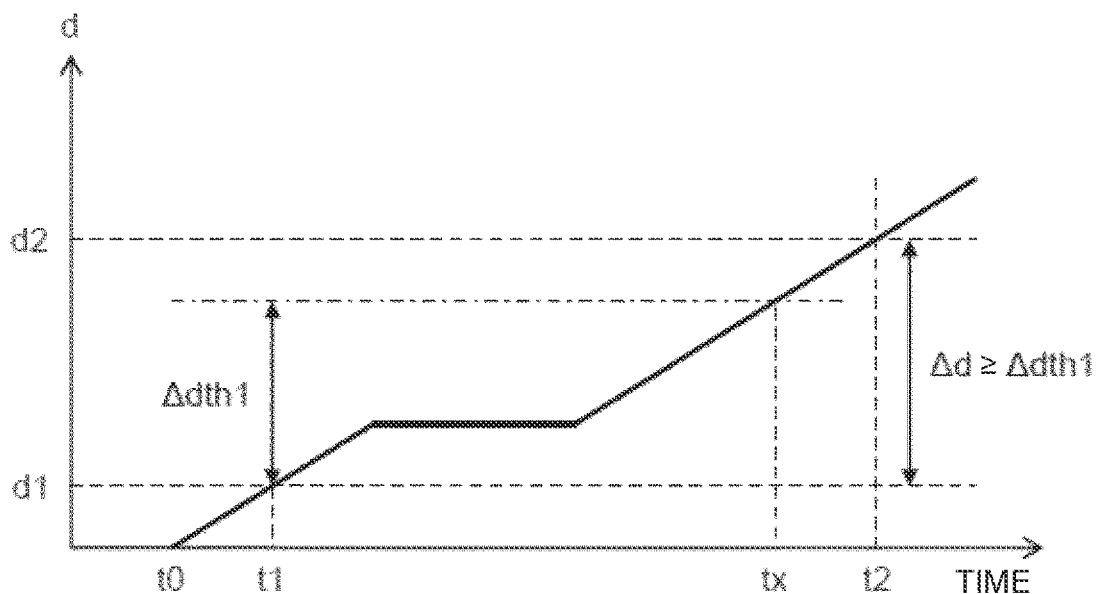
FIG. 10 is a graph chart showing the fourth example of the crossing determination processing according to the embodiment of the present disclosure.

In the example shown in FIG. 10, the target T once stops crossing the roadway area RA for a while and, then, resumes crossing the roadway area RA. In this example, the distance difference Δd reaches the threshold value Δdth1 at time tx that is later than the time at which the target T resumes crossing the roadway area RA. Therefore, when second time t2 becomes later than time tx, the driving assistance system 10 determines that the target T is crossing the roadway area RA.

The crossing condition in the fourth example is that "the second distance d2 is larger than the first distance d1 and the distance difference Δd is equal to or larger than the threshold value Δdth1." The stop condition is that "the distance difference Δd is smaller than the threshold value Δdth1."

2-5. Fifth Example

A fifth example is a modification of the fourth example. In the fifth example, the period from first time t1 to second time t2 is set to be constant. For example, second time t2 is the time at which the latest distance d is calculated. First time t1 is a certain period of time Pc earlier than second time t2. In this example, the distance difference Δd is compared with the threshold value Δdth2.

Figure 11:
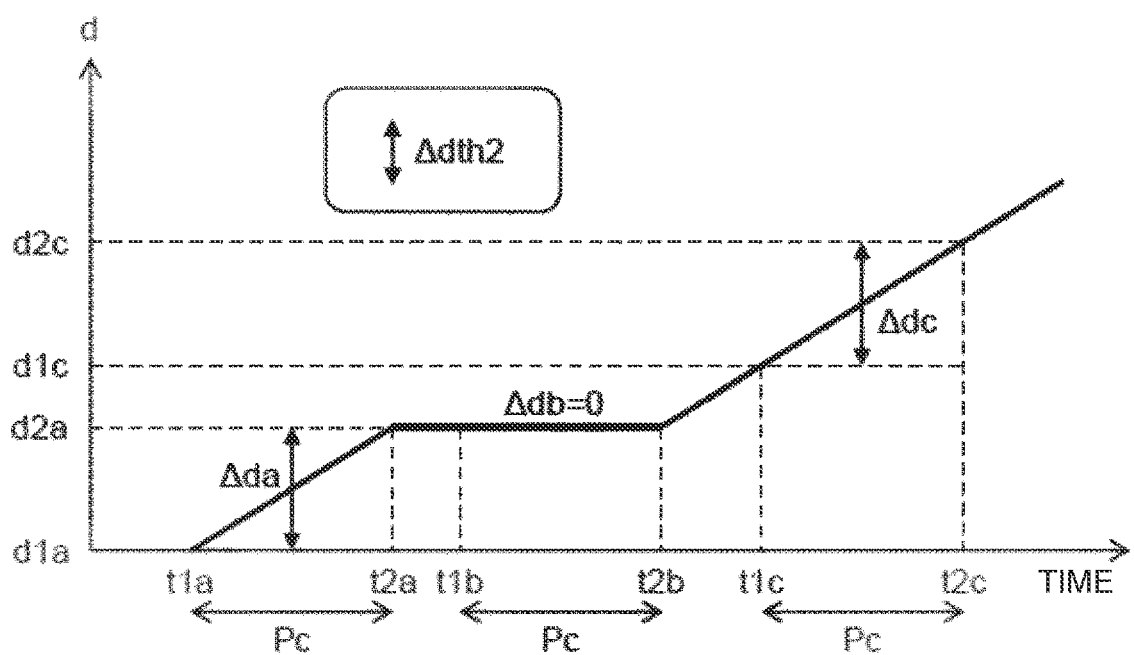
FIG. 11 is a graph chart showing a fifth example of the crossing determination processing according to the embodiment of the present disclosure.

FIG. 11 is a conceptual diagram showing the fifth example. In the period from first time t1a to second time t2a, the distance difference Δda between the second distance d2a and the first distance d1a is equal to or larger than the threshold value Δdth2. Therefore, the driving assistance system 10 determines that the target T is crossing the roadway area RA.

In the period from first time t1b to second time t2b, the distance difference Δdb is smaller than the threshold value Δdth2. Therefore, the driving assistance system 10 determines that the target T is not crossing the roadway area RA.

In the period from first time t1c to second time t2c, the distance difference Δdc between the second distance d2c and the first distance d1c is equal to or larger than the threshold value Δdth2. Therefore, the driving assistance system 10 determines that the target T is crossing the roadway area RA.

In this way, it is possible in the fifth example to determine the behavior of the target T in more detail, for example, it is possible to determine that the target T has stopped crossing or resumed crossing.

3. Example of Driving Assistance System 3-1. Example of Configuration

Figure 12:
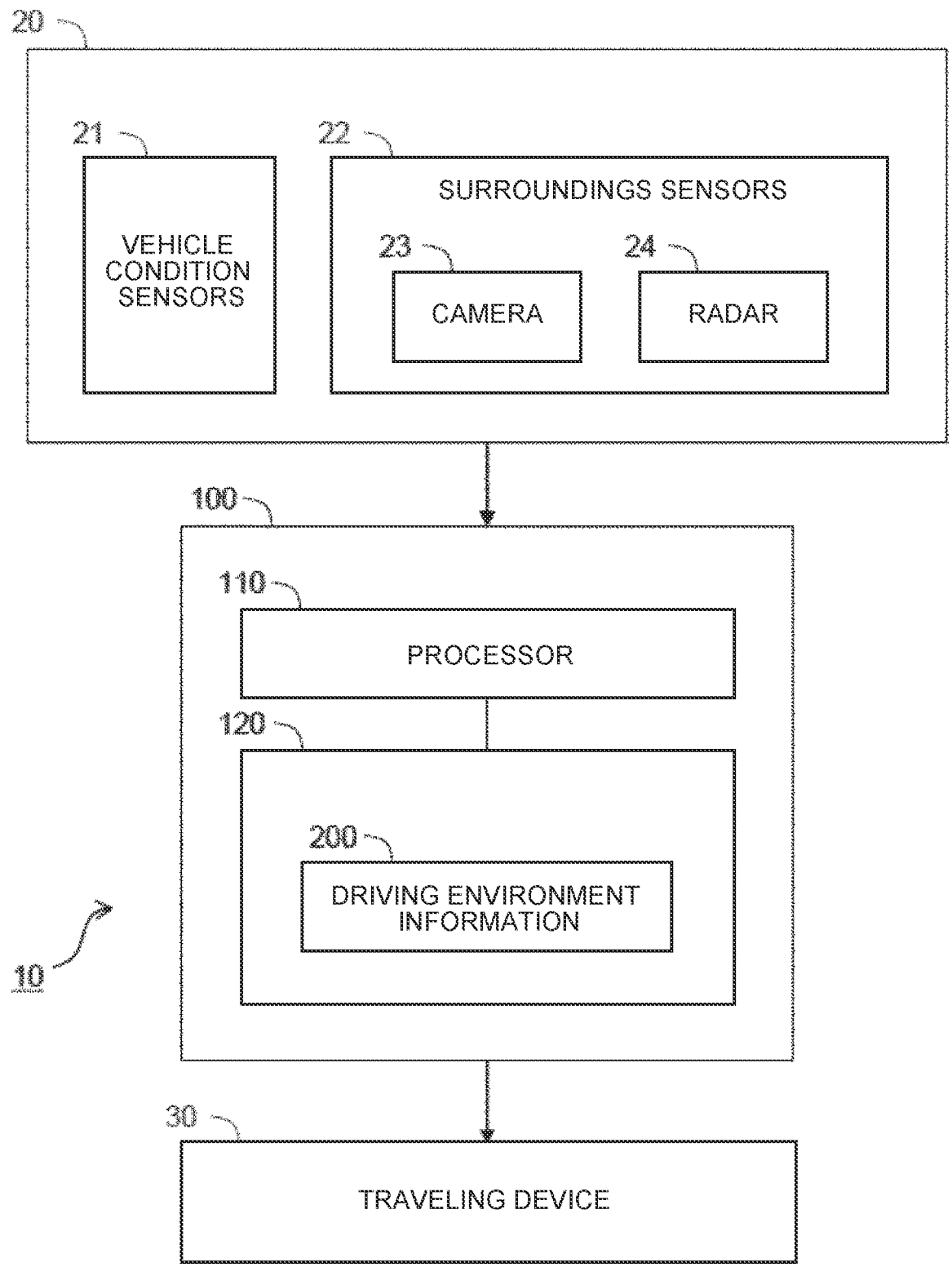
FIG. 12 is a block diagram schematically showing an example of the configuration of a vehicle and the driving assistance system according to the embodiment of the present disclosure.

FIG. 12 is a block diagram schematically showing an example of the configuration of the vehicle 1 and the driving assistance system 10 according to this embodiment. In particular, FIG. 12 shows an example of the configuration related to the driving assistance control. The vehicle 1 includes sensors 20 and a traveling device 30.

The sensors 20 include vehicle condition sensors 21. The vehicle condition sensors 21 detect the condition of the vehicle 1. For example, the vehicle condition sensors 21 include a vehicle speed sensor, a yaw rate sensor, a lateral acceleration sensor, a steering angle sensor, and the like. The vehicle speed sensor detects the vehicle speed of the vehicle 1. The yaw rate sensor detects the yaw rate of the vehicle 1. The lateral acceleration sensor detects the lateral acceleration of the vehicle 1. The steering angle sensor detects the steering angle of the wheels of the vehicle 1.

The sensors 20 further include surroundings sensors 22. The surroundings sensors 22 detect the surroundings of the vehicle 1. More specifically, the surroundings sensors 22 include a camera 23 and a radar (millimeter wave radar) 24. The camera 23 is a capturing device that captures the surroundings of the vehicle 1. The radar 24 is a distance measuring sensor that measures the surroundings of the vehicle 1. The surroundings sensors 22 may further include a Laser Imaging Detection and Ranging (LIDAR).

The traveling device 30 includes a steering device, a driving device, and a braking device. The steering device steers the wheels of the vehicle 1. For example, the steering device includes a power steering (EPS: electric power steering) device. The driving device is the power source that generates driving force. Examples of the driving device include an engine, an electric motor, and an in-wheel motor. The braking device generates braking force.

The driving assistance system 10 includes at least a control device 100. The driving assistance system 10 may include the sensors 20. The driving assistance system 10 may include the traveling device 30.

The control device 100 controls the vehicle 1. Typically, the control device 100 is a microcomputer mounted on the vehicle 1. The control device 100 is also called an electronic control unit (ECU). Alternatively, the control device 100 may also be an information processing device external to the vehicle 1. In that case, the control device 100 communicates with the vehicle 1 to remotely control the vehicle 1.

The control device 100 includes a processor 110 and a storage device 120. The processor 110 performs various types of processing. The storage device 120 stores various types of information. Examples of the storage device 120 include a volatile memory, a non-volatile memory, and a hard disk drive (HDD). Various types of processing by the processor 110 (the control device 100) are implemented when the processor 110 executes the control program composed of computer programs. The control program is stored in the storage device 120 or recorded on a computer-readable recording medium.

3-2. Information Acquisition Processing

The processor 110 (control device 100) performs the "information acquisition processing" for acquiring the driving environment information 200 that indicates the driving environment of the vehicle 1. The driving environment information 200 is acquired based on the result detected by the sensors 20 mounted on the vehicle 1. The acquired driving environment information 200 is stored in the storage device 120.

Figure 13:
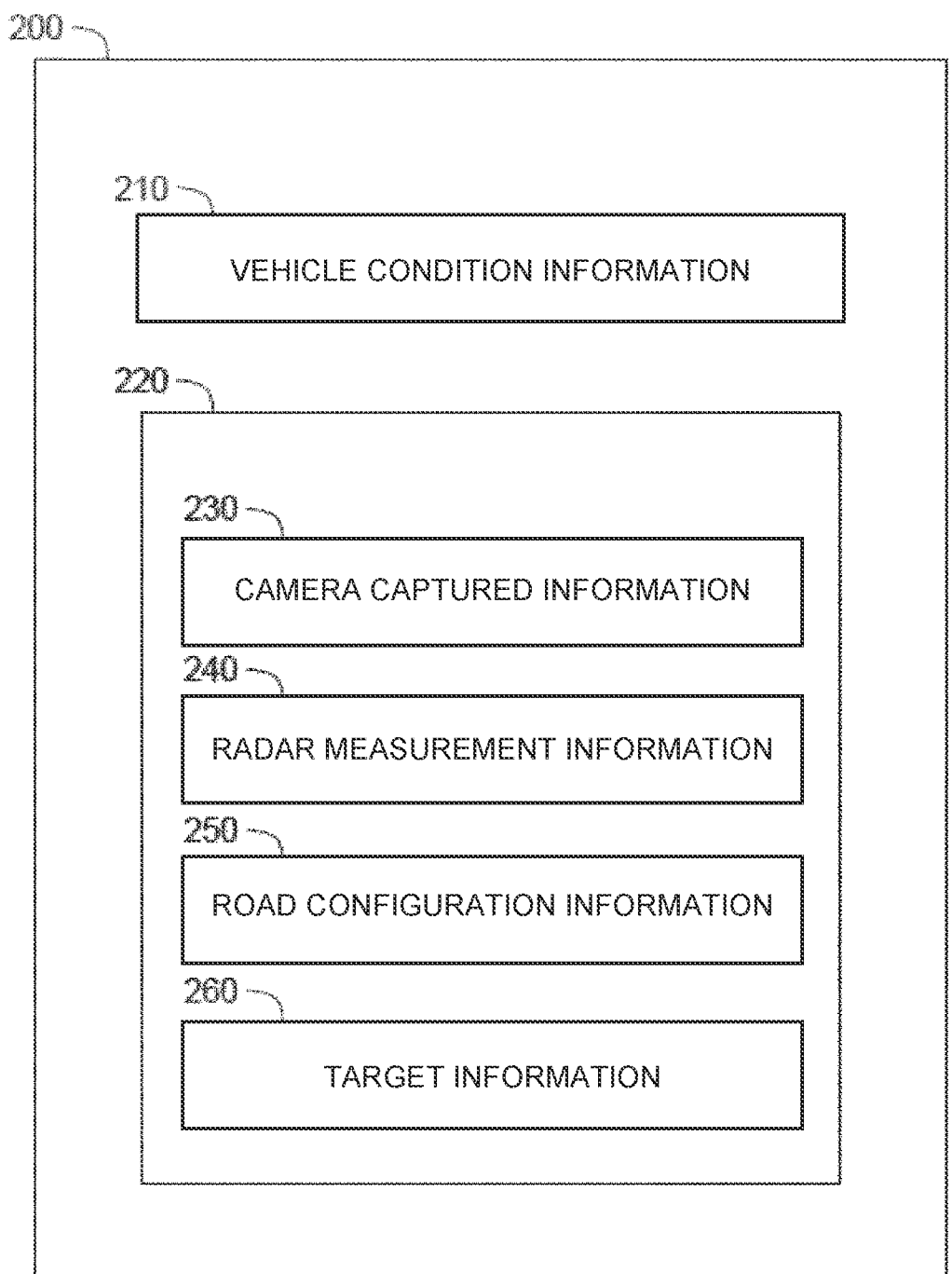
FIG. 13 is a block diagram showing an example of driving environment information in the embodiment of the present disclosure.

FIG. 13 is a block diagram showing an example of the driving environment information 200. The driving environment information 200 includes vehicle condition information 210 and surroundings information 220.

The vehicle condition information 210 is the information indicating the condition of the vehicle 1. Examples of the condition of the vehicle 1 include the vehicle speed, yaw rate, lateral acceleration, and steering angle. The processor 110 acquires the vehicle condition information 210 from the result detected by the vehicle condition sensor 21.

The surroundings information 220 is the information indicating the surroundings of the vehicle 1. The processor 110 acquires the surroundings information 220 based on the result detected by the surroundings sensors 22. For example, the surroundings information 220 includes camera captured information 230, radar measurement information 240, road configuration information 250, and target information 260.

The camera captured information 230 is the information indicating the result captured by the camera 23. The camera captured information 230 includes the image information indicating the surroundings of the vehicle 1 captured by the camera 23.

The radar measurement information 240 is the information indicating the result measured by the radar 24. The radar measurement information 240 includes the information on the objects around the vehicle 1 (e.g., relative position and relative speed).

The road configuration information 250 is the information on the road configuration around the vehicle 1. The road configuration around the vehicle 1 includes lane marking lines (white lines) and roadside objects. Roadside objects are three-dimensional obstacles that indicate the edge of a road. Examples of roadside objects include a curb, a guardrail, a wall, a median strip, and grass. The road configuration information 250 indicates at least the positions of lane marking lines or roadside objects (relative positions with respect to the vehicle 1).

For example, by analyzing the camera captured information 230 (image information), a lane marking line can be identified and the relative position of the lane marking line can be calculated. Examples of image analysis methods include semantic segmentation and edge detection. Similarly, by analyzing the camera captured information 230 (image information), a roadside object can be identified and the relative position of the roadside object can be calculated. Alternatively, since the reflection intensity of the radar wave from a three-dimensional roadside object is strong, the relative position of the roadside object can also be acquired from the radar measurement information 240.

The target information 260 is the information on a target around the vehicle 1. Examples of a target include a pedestrian, a bicycle, a motorcycle, another vehicle (preceding vehicle, parked vehicle, etc.), an animal, and a falling object. The target information 260 indicates the relative position and relative speed of a target with respect to the vehicle 1. For example, by analyzing the camera captured information 230 (image information), it is possible to identify a target and to calculate the relative position of the target. In addition, based on the radar measurement information 240, it is also possible to identify a target and to acquire the relative position and relative speed of the target. The target information 260 may include the moving direction and moving speed of a target. The moving direction and moving speed of a target can be calculated by tracking the position of the target.

3-3. Vehicle Traveling Control

The processor 110 (the control device 100) performs the "vehicle traveling control" for controlling the traveling of the vehicle 1. The vehicle traveling control includes the steering control for controlling the steering of the vehicle 1, the acceleration control for controlling the acceleration of the vehicle 1, and the deceleration control for controlling the deceleration of the vehicle 1. The processor 110 performs the vehicle traveling control by controlling the traveling device 30. More specifically, the processor 110 performs the steering control by controlling the steering device. The processor 110 also performs the acceleration control by controlling the driving device. The control device 100 performs the deceleration control by controlling the braking device.

3-4. Driving Assistance Control

The processor 110 (the control device 100) performs the "driving assistance control" for assisting the driving of the vehicle 1. In particular, the processor 110 performs the driving assistance control (collision avoidance control, risk avoidance control) for avoiding collision with a target in front of the vehicle 1. The driving assistance control for avoiding collision with a target in front of the vehicle 1 includes at least one of the deceleration control and the steering control. The processor 110 performs the driving assistance control based on the driving environment information 200 described above.

Figure 14:
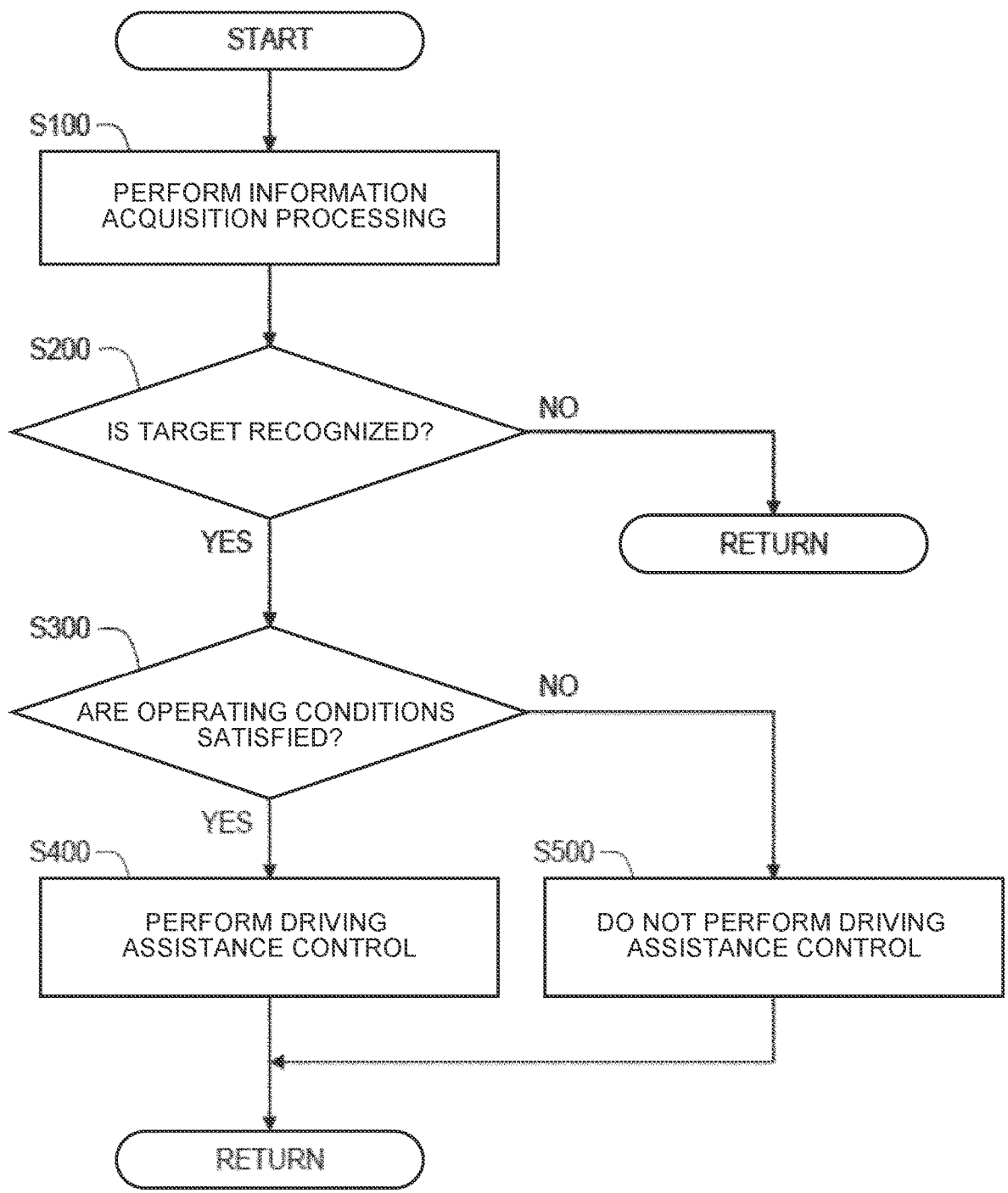
FIG. 14 is a flowchart showing the processing related to driving assistance control performed by the driving assistance system according to the embodiment of the present disclosure.

FIG. 14 is a flowchart showing the processing related to the driving assistance control according to this embodiment. The processing flow shown in FIG. 14 is repeatedly performed at regular intervals.

In step S100, the processor 110 performs the information acquisition processing described above. That is, the processor 110 acquires the driving environment information 200 based on the result detected by the sensors 20. The driving environment information 200 is stored in the storage device 120.

In step S200, the processor 110 determines whether the target T is in front of the vehicle 1 based on the target information 260. In other words, the processor 110 determines whether the target T is recognized in the area in front of the vehicle 1. When the target T is in front of the vehicle 1 (step S200; Yes), the processing proceeds to step S300. On the other hand, when the target T is not in front of the vehicle 1 (step S200; No), the processing in this cycle ends.

In step S300, the processor 110 determines whether the operating conditions for the driving assistance control are satisfied. The operating conditions for the driving assistance control are, for example, conditions that "the target T is crossing the roadway area RA in front of the vehicle 1." In this case, step S300 includes the crossing determination processing described above. When the operating conditions are satisfied (step S300; Yes), the processing proceeds to step S400. On the other hand, when the operating conditions are not satisfied (step S300; No), the processing proceeds to step S500.

In step S400, the processor 110 performs the driving assistance control, that is, the processor 110 activates the driving assistance control. More specifically, to avoid collision between the vehicle 1 and the target, the processor 110 performs at least one of the deceleration control and the steering control described above based on the driving environment information 200. For example, based on the vehicle condition information 210 and the target information 260, the processor 110 calculates at least one of the target deceleration rate and the target steering angle required to avoid collision with the target. The processor 110 controls the braking device according to the target deceleration rate and/or controls the steering device according to the target steering angle.

In step S500, the processor 110 does not perform the driving assistance control. That is, the processor 110 does not activate the driving assistance control. When the driving assistance control is already in operation, the processor 110 stops the driving assistance control.

3-5. Crossing Determination Processing

Figure 15:
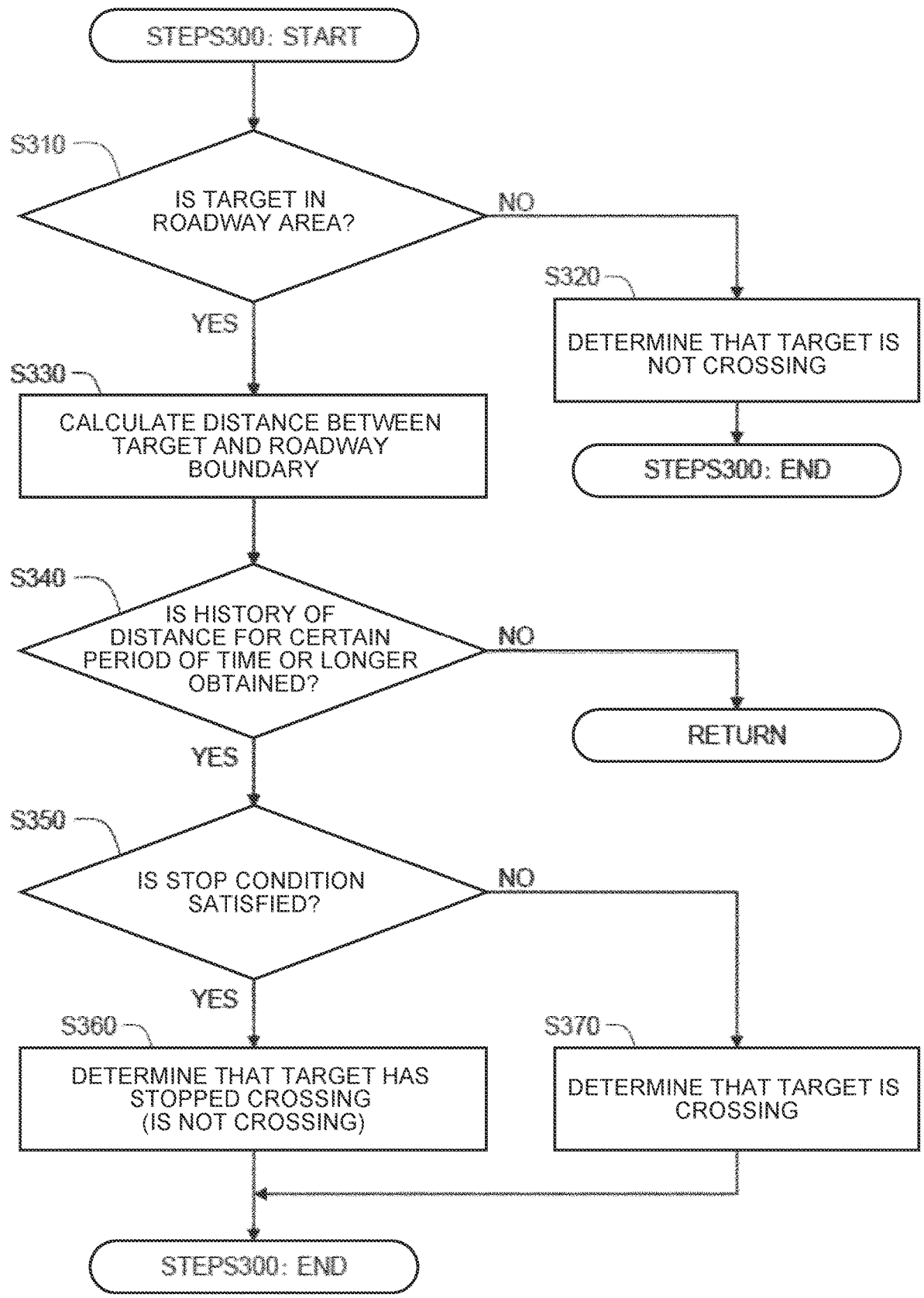
FIG. 15 is a flowchart showing the crossing determination processing according to the embodiment of the present disclosure.

FIG. 15 is a flowchart showing the crossing determination processing according to this embodiment. The crossing determination processing is performed, for example, in step S300 described above.

In step S310, the processor 110 determines whether the target T in front of the vehicle 1 is in the roadway area RA. The position of the target T and the position of the first road boundary RB1 of the roadway area RA are obtained from the surroundings information 220 (target information 260 and road configuration information 250). The processor 110 determines whether the target T in front of the vehicle 1 is in the roadway area RA based on the position of the target T and the position of the first road boundary RB1.

When the target T is not in the roadway area RA (step S310; No), the processor 110 determines that the target T is not crossing the roadway area RA (step S320). In this case, the processor 110 ends the crossing determination processing.

On the other hand, when the target T is in the roadway area RA (step S310; Yes), the processing proceeds to step S330. In step S330, the processor 110 calculates the distance d between the target T and the first roadway boundary RB1. The processor 110 repeatedly calculates the distance d and keeps the history of the distance d. When the history of the distance d for a certain period of time or longer is obtained (step S340; Yes), the processing proceeds to step S350.

In step S350, based on the relationship between the distance d and the time, the processor 110 determines whether the stop condition is satisfied. Various examples of the stop condition are as given in Section 2 Crossing Determination Processing described above (see FIG. 6 to FIG. 11). When the stop condition is satisfied (step S350; Yes), the processor 110 determines that the target T has stopped crossing the roadway area RA, that is, the target T is not crossing the roadway area RA (step S360). On the other hand, when the stop condition is not satisfied (step S350; No), the processor 110 determines that the target T is crossing the roadway area RA (step S370).

As described above, when the target T is in the roadway area RA, the distance d between the target T and the first roadway boundary RB1 is calculated in this embodiment. After that, based on the relationship between the distance d and the time, the crossing determination processing is performed. As a result, the accuracy in the crossing determination is improved.

What is claimed is:

1. A driving assistance system comprising:
   a memory that stores surroundings information indicating surroundings of a vehicle detected by sensors mounted on the vehicle; and
   a processor configured to:
   acquire a position of a target in front of the vehicle and a position of a boundary of a roadway area in front of the vehicle based on the surroundings information, to determine whether the target is in the roadway area based on the position of the target and the position of the boundary, to calculate a distance between the target and the boundary when the target is in the roadway area, and to determine whether the target is crossing the roadway area based on a relationship between the distance and a time,
   determine that the target is not crossing the roadway area when a state in which the distance does not exceed a predetermined value continues for a certain period of time or longer, and
   perform at least one of steering control and deceleration control of the vehicle so as to avoid the target when it is determined that the target is crossing the roadway area.

2. The driving assistance system according to claim 1, wherein the processor is configured to determine that the target is not crossing the roadway area when a state in which the distance does not increase continues for a certain period of time or longer.

3. The driving assistance system according to claim 1, wherein:
   a first distance is the distance at a first time;
   a second distance is the distance at a second time, the second time being later than the first time; and
   the processor is configured to determine that the target is crossing the roadway area when the second distance is larger than the first distance and when a difference between the second distance and the first distance is equal to or larger than a threshold value.

4. The driving assistance system according to claim 3, wherein the processor is configured to determine that the target is not crossing the roadway area when the difference between the second distance and the first distance is smaller than the threshold value.

5. The driving assistance system according to claim 3, wherein a period from the first time to the second time is constant.

6. A driving assistance system comprising:
   a memory that stores surroundings information indicating surroundings of a vehicle detected by sensors mounted on the vehicle; and
   a processor configured to:
   acquire a position of a target in front of the vehicle and a position of a boundary of a roadway area in front of the vehicle based on the surroundings information, to determine whether the target is in the roadway area based on the position of the target and the position of the boundary, to calculate a distance between the target and the boundary when the target is in the roadway area, and to determine whether the target is crossing the roadway area based on a relationship between the distance and a time,
   determine that the target is not crossing the roadway area when a state in which the distance does not increase continues for a certain period of time or longer, and
   perform at least one of steering control and deceleration control of the vehicle so as to avoid the target when it is determined that the target is crossing the roadway area.

7. A driving assistance system comprising:
   a memory that stores surroundings information indicating surroundings of a vehicle detected by sensors mounted on the vehicle; and
   a processor configured to:
   acquire a position of a target in front of the vehicle and a position of a boundary of a roadway area in front of the vehicle based on the surroundings information, to determine whether the target is in the roadway area based on the position of the target and the position of the boundary, to calculate a distance between the target and the boundary when the target is in the roadway area, and to determine whether the target is crossing the roadway area based on a relationship between the distance and a time, determine that the target is crossing the roadway area when a second distance is larger than a first distance and when a difference between the second distance and the first distance is equal to or larger than a threshold value, the first distance is the distance at a first time, and the second distance is the distance at a second time, the second time being later than the first time; and perform at least one of steering control and deceleration control of the vehicle so as to avoid the target when it is determined that the target is crossing the roadway area.

8. The driving assistance system according to claim 7, wherein the processor is configured to determine that the target is not crossing the roadway area when the difference between the second distance and the first distance is smaller than the threshold value.

9. The driving assistance system according to claim 7, wherein a period from the first time to the second time is constant.

\* \* \* \* \*